(12) United States Patent
Nishida

(10) Patent No.: US 9,885,321 B2
(45) Date of Patent: Feb. 6, 2018

(54) MULTI-CYLINDER INTERNAL COMBUSTION ENGINE

(71) Applicant: TOYOTA JIDOSHA KABUSHIKI KAISHA, Toyota-shi, Aichi-ken (JP)

(72) Inventor: Kentaro Nishida, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/651,439

(22) PCT Filed: Apr. 25, 2013

(86) PCT No.: PCT/JP2013/062278
§ 371 (c)(1),
(2) Date: Jun. 11, 2015

(87) PCT Pub. No.: WO2014/174644
PCT Pub. Date: Oct. 30, 2014

(65) Prior Publication Data
US 2016/0032870 A1    Feb. 4, 2016

(51) Int. Cl.
*F02M 25/07* (2006.01)
*F02B 47/08* (2006.01)
(Continued)

(52) U.S. Cl.
CPC ......... *F02M 25/0735* (2013.01); *F02B 47/08* (2013.01); *F02D 13/0249* (2013.01); *F02D 13/0261* (2013.01); *F02M 25/028* (2013.01); *F02M 25/0222* (2013.01); *F02M 25/0227* (2013.01); *F02M 25/03* (2013.01);
(Continued)

(58) Field of Classification Search
CPC ............ F02M 25/0735; F01N 2610/00; Y02T 10/121; Y02T 10/18
See application file for complete search history.

(56) References Cited

U.S. PATENT DOCUMENTS

| 6,986,252 B2* | 1/2006 | Hedman | F01B 17/04 123/25 C |
| 2010/0204907 A1* | 8/2010 | Nakatani | F02D 13/0234 701/108 |

(Continued)

FOREIGN PATENT DOCUMENTS

| JP | 10-318049 | 12/1998 |
| JP | 2003-201922 | 7/2003 |

*Primary Examiner* — Joseph Dallo
*Assistant Examiner* — Kurt Liethen
(74) *Attorney, Agent, or Firm* — Finnegan, Henderson, Farabow, Garrett & Dunner, LLP

(57) ABSTRACT

This multi-cylinder internal combustion engine (1) is provided with an EGR device (30) containing an EGR cooler (27), a valve overlap period in which valve opening periods of intake valves (20) and exhaust valves (21) overlap one another is set, and the multi-cylinder internal combustion engine (1) has four cylinders (2). The multi-cylinder internal combustion engine (1) comprises: four exhaust side branch conduits (15), one provided for each of the cylinders (2); a storage tank (31) configured to store condensed water (CW) generated by the EGR cooler (27); and four condensed water introduction conduits (33), one provided for each of the exhaust side branch conduits (15) and communicating the exhaust side branch conduit (15) with the storage tank (31).

5 Claims, 9 Drawing Sheets

(51) Int. Cl.
*F02M 25/03* (2006.01)
*F02M 25/022* (2006.01)
*F02D 13/02* (2006.01)
*F02M 25/028* (2006.01)
*F02M 26/50* (2016.01)
*F02M 26/23* (2016.01)
*F02M 26/35* (2016.01)

(52) U.S. Cl.
CPC ............ *F02M 26/23* (2016.02); *F02M 26/35* (2016.02); *F02M 26/50* (2016.02); *F01N 2610/00* (2013.01); *Y02T 10/121* (2013.01); *Y02T 10/18* (2013.01)

(56) References Cited

U.S. PATENT DOCUMENTS

| | | | | |
|---|---|---|---|---|
| 2014/0102428 A1* | 4/2014 | Fulton | ................. | F02B 29/0468 123/568.12 |
| 2014/0190148 A1* | 7/2014 | Ruhland | ............ | F02M 25/0735 60/274 |
| 2015/0300296 A1* | 10/2015 | Mulye | .................... | F02M 25/07 123/676 |

* cited by examiner

FIG. 8
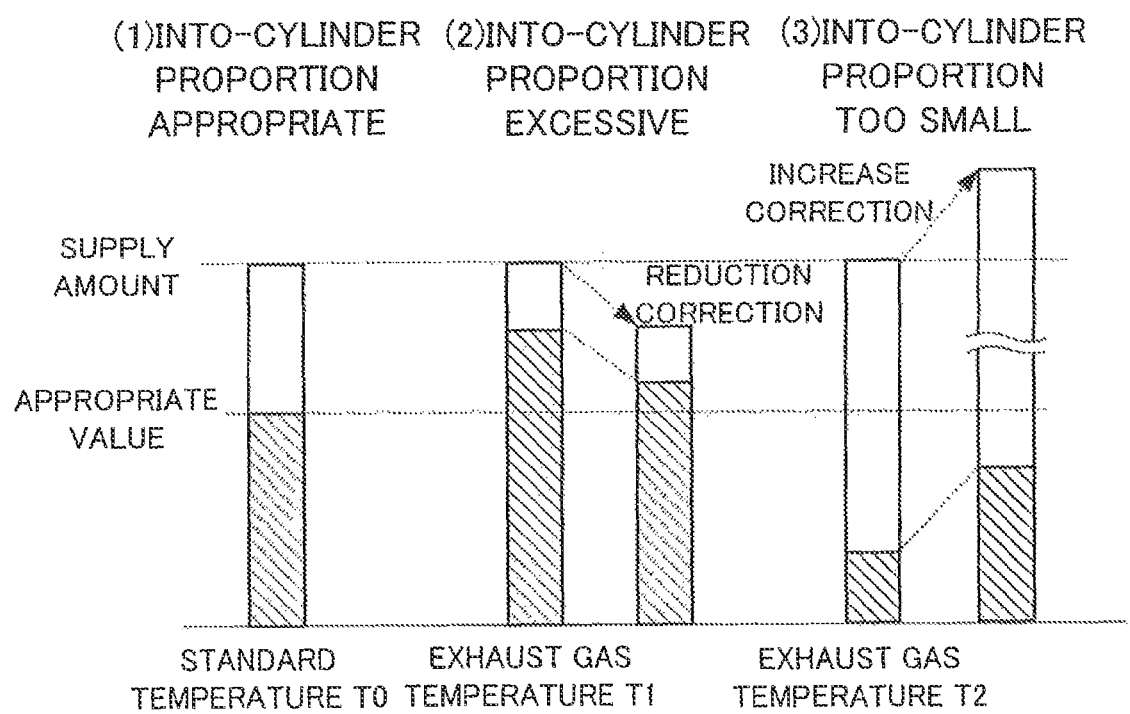
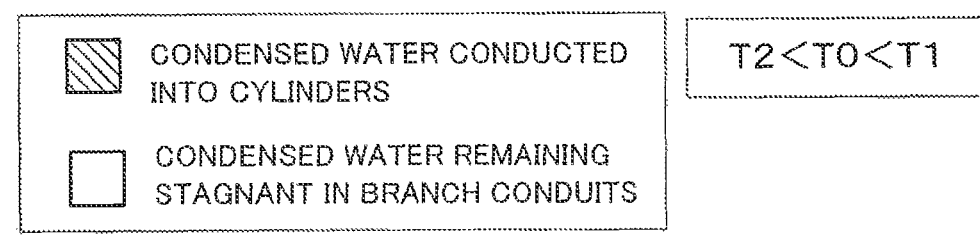

MULTI-CYLINDER INTERNAL COMBUSTION ENGINE

CROSS-REFERENCE TO RELATED APPLICATIONS

This application is a national phase application of International Application No. PCT/JP2013/062278, filed Apr. 25, 2013, the content of which is incorporated herein by reference.

TECHNICAL FIELD

The present invention relates to a multi-cylinder internal combustion engine that is equipped with an EGR device.

BACKGROUND ART

An internal combustion engine is per se known in which condensed water generated by the EGR cooler is stored, and this stored condensed water is injected into the intake passage (refer to Patent Document #1). Apart from the above, it may be considered that Patent Document #2 in the Citation List below may have some relevance to the present invention.

CITATION LIST

Patent Literature

Patent Document #1: JP1998-318049A.
Patent Document #2: JP2003-201922A.

SUMMARY OF INVENTION

Technical Problem

With the internal combustion engine of Patent Document #1, along with an intake air, the condensed water that has been injected into the intake passage being supplied into the cylinders, the combustion temperature is kept down by this condensed water that has been supplied into the cylinders being vaporized. However, since the condensed water is acidic, if a pump is employed to supply the condensed water into the cylinders, there may be a problem with corrosion of the pump.

Accordingly, the object of the present invention is to provide a multi-cylinder internal combustion engine that, by supplying condensed water into the cylinders without using any pump, is capable of avoiding corrosion of such a pump.

Solution to Technical Problem

The multi-cylinder internal combustion engine of the present invention is a multi-cylinder internal combustion engine to which an EGR device comprising an EGR cooler is provided, for which a valve overlap period in which valve opening periods of intake valves and of exhaust valves overlap one another is set, and moreover comprising a plurality of cylinders, and comprising: a plurality of exhaust side branch conduits, one provided for each of the cylinders; a condensed water accumulation portion configured to store condensed water generated by the EGR cooler; and a plurality of condensed water introduction conduits, one provided for each of the exhaust side branch conduits and communicating the exhaust side branch conduit with the condensed water accumulation portion.

According to this multi-cylinder internal combustion engine, for each cylinder, the exhaust side branch conduit and the condensed water accumulation portion are communicated together by the condensed water introduction conduit. Due to this, when the intake stroke of one cylinder and the exhaust stroke of another cylinder overlap one another, the exhaust gas pulsation generated by the exhaust stroke of the other pressurizes the interior of the condensed water accumulation portion via the condensed water introduction conduit. And, due to the interior of the condensed water accumulation portion being thus pressurized, during the valve overlap period in the intake stroke of the one cylinder, the pressure at the outlet of its condensed water introduction conduit that is connected to its exhaust side branch conduit is reduced below the pressure within the condensed water accumulation portion. Due to this pressure difference, during the valve overlap period, condensed water that has been accumulated in the condensed water accumulation portion is supplied to the exhaust side branch conduit and thence to the one cylinder via the condensed water introduction conduit. Thus, with the multi-cylinder internal combustion engine of the present invention, since it is possible to supply the condensed water into the cylinder in this manner without using any pump, accordingly it is possible to avoid the problem of corrosion of such a pump.

As an aspect of the multi-cylinder internal combustion engine of the present invention, there may be further provided a variable valve gear capable of varying the length of the valve overlap period, and a condensed water supply amount control device configured to control the variable valve gear so that the length of the valve overlap period changes on the basis of a requested supply amount of the condensed water to be supplied into the cylinders via the condensed water introduction conduits. According to this aspect, it is possible to change the amount of condensed water that is supplied into the cylinders by changing the length of the valve overlap period with the variable valve gear. Due to this, it is possible to adjust the amount of condensed water supplied into the cylinders to an appropriate level.

It would also be possible, according to this aspect of the present invention, for the condensed water supply amount control device to correct the length of the valve overlap period in the direction to decrease it when the temperature of the exhaust gas is higher than a predetermined standard temperature. When condensed water is supplied to the exhaust side branch conduits, some of that water remains stagnant in the exhaust side branch conduits, while other portions are conducted into the cylinders. If the ratio between the condensed water that remains stagnant in the exhaust side branch conduits and the condensed water that is conducted into the cylinders is appropriate, then the exhaust gas temperature is maintained at the standard temperature. But there is a possibility that the relationship between this ratio and the standard temperature may change due to individual differences between engines and due to long term deterioration. If the proportion of condensed water that is conducted into the cylinders is excessive, then the exhaust gas temperature will become higher than the standard temperature. On the other hand, if the proportion of condensed water that is conducted into the cylinders is insufficient, then the exhaust gas temperature will become lower than the standard temperature. Accordingly, by correcting the length of the valve overlap period in the direction to decrease it if the exhaust gas temperature is higher than the standard temperature as described above, since the amount of condensed water that is conducted into the cylinders is reduced, accordingly it is possible to bring the previously excessive amount of the condensed water that is supplied into the cylinders closer to an appropriate value.

As an aspect of the multi-cylinder internal combustion engine of the present invention, the variable valve gear may be adapted to be able to open the exhaust valves during an intake stroke after the valve overlap period has ended; and the condensed water supply amount control device may be configured to control the variable valve gear so that, if a requested value for the length of the valve overlap period on the basis of the requested supply amount is greater than an upper limit value, the exhaust valves are opened during the intake stroke after the valve overlap period has ended. Since there is an upper limit upon the length of the value overlap period due to limitations upon the mechanism, accordingly increasing the amount of condensed water that is supplied by increasing the length of the valve overlap period is subject to limitation. According to this aspect of the present invention, if the requested value for the length of the valve overlap period exceeds the upper limit value, then, after the valve overlap period has ended and the exhaust valves have temporarily closed, it is possible to conduct additional condensed water into the cylinders by opening the exhaust valves again. By doing this, it is possible to increase the limit upon the amount of condensed water that is supplied into the cylinders.

As an aspect of the multi-cylinder internal combustion engine of the present invention, the EGR cooler and the condensed water accumulation portion may be disposed vertically above the plurality of exhaust side branch conduits. According to this aspect of the present invention, it is possible to supply condensed water from the condensed water accumulation portion into the exhaust side branch conduits, not only by utilizing the pressure differences between the inlets of the condensed water introduction conduits which are connected to the condensed water accumulation portion and the outlets of the condensed water introduction conduits which are connected to the exhaust side branch conduits, but also by taking advantage of gravity. Due to this, the supply of condensed water becomes simple and easy, as compared to the case in which the EGR cooler and the condensed water accumulation portion are not disposed vertically above the exhaust side branch conduits.

BRIEF DESCRIPTION OF DRAWINGS

FIG. 8 is an explanatory figure for explanation of the details of control according to a third embodiment.

DESCRIPTION OF EMBODIMENTS

Embodiment #1

Figure 1:
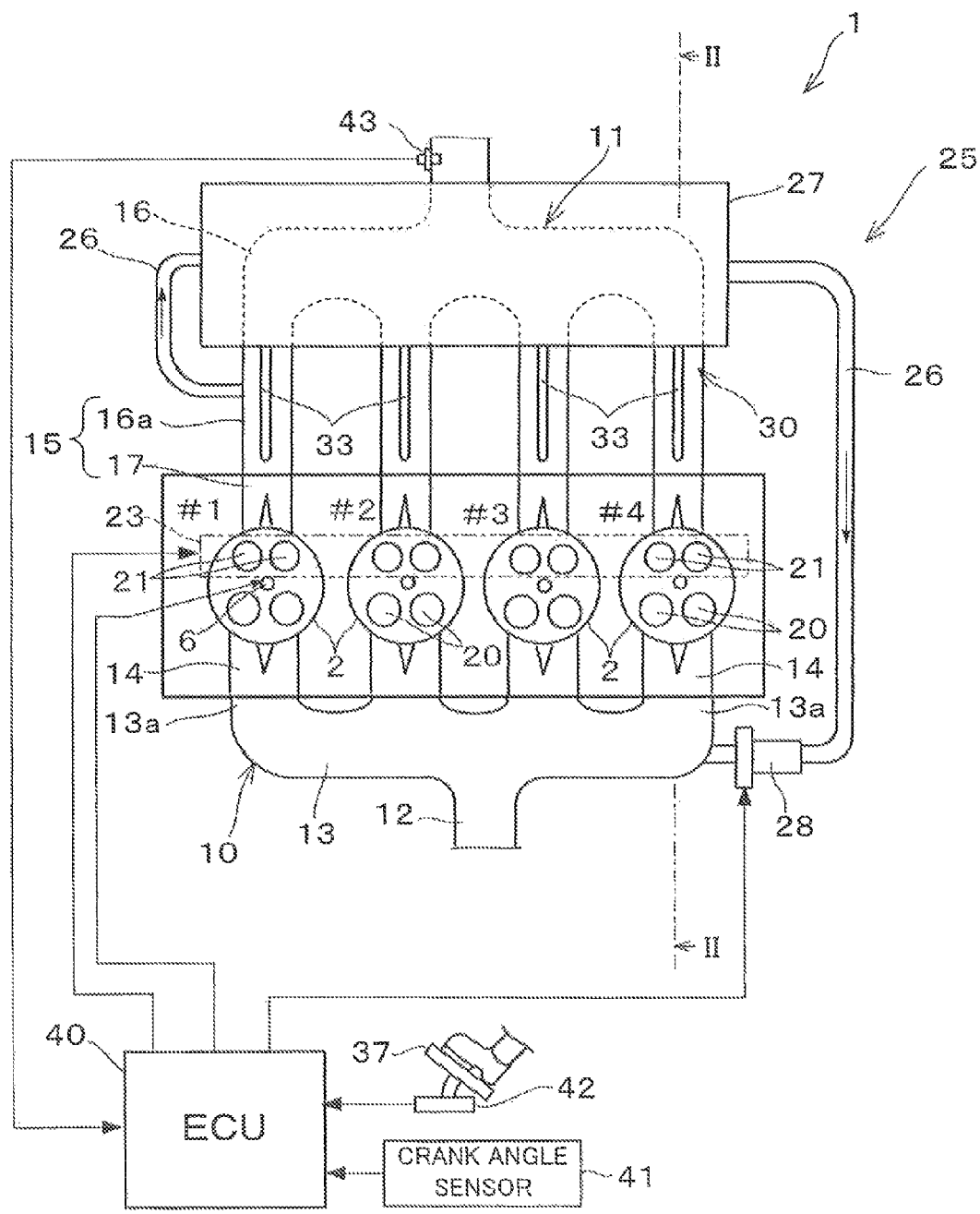
FIG. 1 is a figure schematically showing a multi-cylinder internal combustion engine according to an embodiment of the present invention in its state as seen vertically from above.
Figure 2:
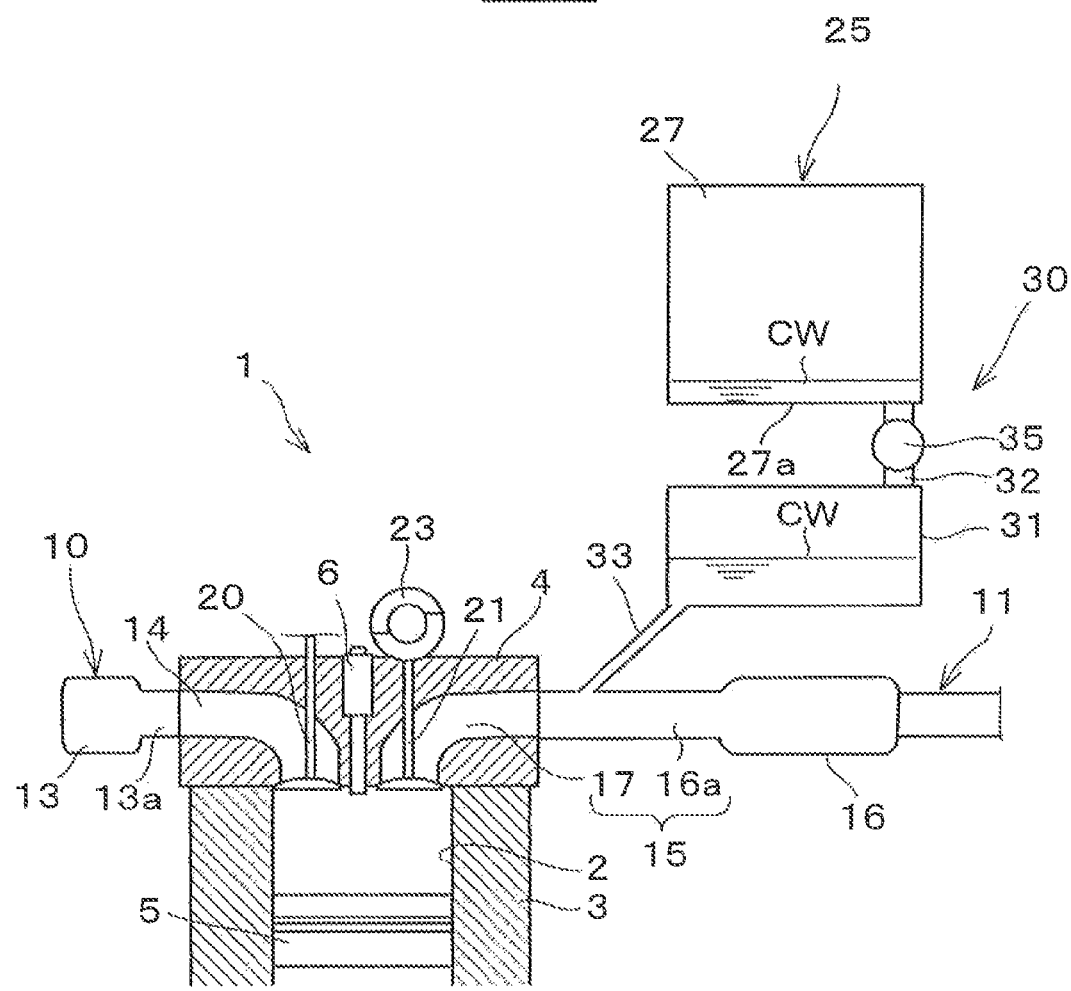
FIG. 2 is a sectional view taken along lines II-II in FIG. 1.
Figure 3:
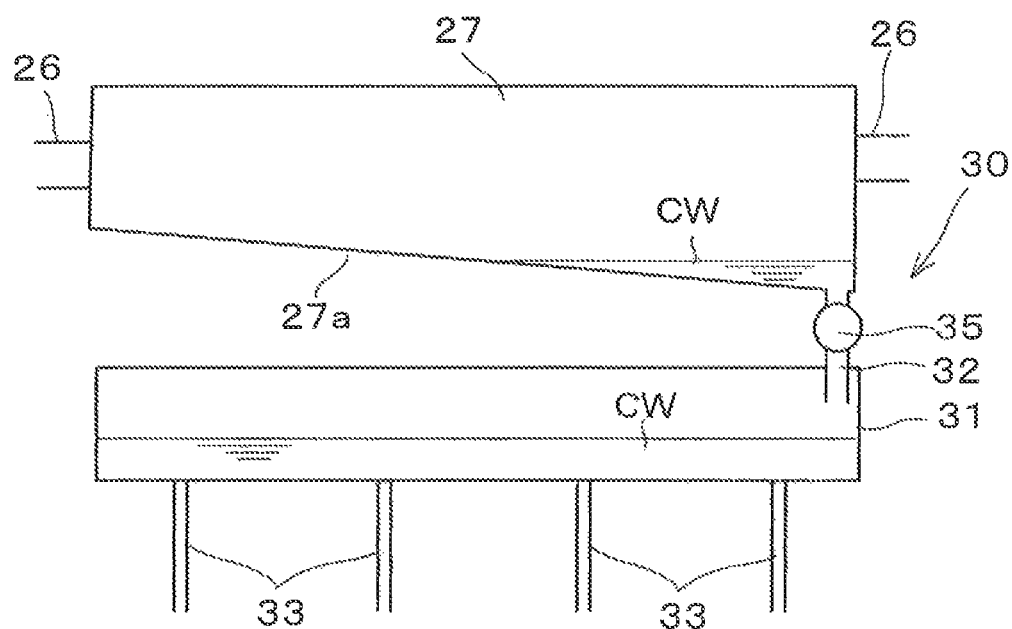
FIG. 3 is a figure showing the situation as seen from the direction of the arrow sign III in FIG. 1.

As shown in FIG. 1 through FIG. 3, a multi-cylinder internal combustion engine 1 (hereinafter termed the "engine") is built as a four-cylinder type in line diesel engine in which four cylinders 2 are arranged along a straight line. This engine 1 is, for example, mounted as a power source for an automobile. The engine 1 comprises a cylinder block 3 in which the cylinders 2 are formed, and a cylinder head 4 that is attached to the cylinder block 3 so as to close the upper openings of the cylinders 2. Pistons 5 are inserted into the cylinders 2 and reciprocate freely therein. In order to supply fuel into the cylinders 2, each of the cylinders 2 is provided with a fuel injector 6, which is fitted to its cylinder so that its end is exposed in the ceiling portion thereof. Fuel is supplied under pressure to these fuel injectors 6 via a common rail not shown in the figures.

An intake passage 10 and an exhaust passage 11 are connected to the cylinders 2. Air conducted through the intake passage 10 is charged into each of the cylinders 2 in order. When the cylinders are numbered as #1, #2, #3, and #4 in order from the left to the right in FIG. 1, the combustion sequence of this engine 1 is set to #1 → #3 → #2. Fuel injected into the cylinders 2 from the fuel injectors 6 is self-ignited in their compression strokes according to this combustion sequence. And the exhaust gas after combustion is conducted to the exhaust passage 11, with this exhaust gas conducted to the exhaust passage 11 being emitted to the atmosphere after having been purified by an exhaust gas purification device not shown in the figures.

The intake passage 10 comprises an intake conduit 12 into which air is conducted after having been filtered by an air filter not shown in the figures, an intake manifold 13 that distributes this air conducted into the intake conduit 12 to the cylinders 2, and intake ports 14 that are connected to branch conduits 13a into which the intake manifold 13 branches and that are formed in the cylinder head 4 so as to lead to the cylinders 2. The exhaust passage 11 comprises four exhaust side branch conduits 15 one of which is provided for each of the cylinders 2, and an exhaust manifold 16 into which these exhaust side branch conduits 15 converge. Each of the exhaust side branch conduits 15 comprises an exhaust port 17 that is formed in the cylinder head 4 so as to lead to one of the cylinders 2, and a branch conduit 16a of the exhaust manifold 16 that is connected to that exhaust port 17.

Each of the intake ports 14 for a single cylinder 2 branches into two, and these two branch portions open into the cylinder 2. These opening portions of the intake port 14 are opened and closed by intake valves 20, two of which are provided for each cylinder 2. In a similar manner, each of the exhaust ports 17 for a single cylinder 2 branches into two, and these two branch portions open into the cylinder 2. These opening portions of the exhaust port 17 are opened and closed by exhaust valves 21, two of which are provided for each cylinder 2. The intake valves 20 are driven to open and close at timings (i.e. at crank angles) that are determined in advance by a per se known valve gear (not shown in the figures). On the other hand, the exhaust valves 21 are driven to open and close by a variable valve gear 23. This variable valve gear 23 is a per se known mechanism that is capable of continuously varying the characteristics at which the exhaust valves 21 are driven, such as their opening timings, their operating angles, their lift amounts, and so on. Due to the operation of the variable valve gear 23, it is possible to vary the length of the valve overlap period by which the valve opening periods of the intake valves 20 and the valve opening periods of the exhaust valves 21 overlap. Moreover, it is also possible to operate the variable valve gear 23 so as to provide so-called double opening in which, after each exhaust valve 21 has closed, that exhaust valve 21 opens for a second time and thereafter closes again.

As shown in FIG. 1, an EGR device 25 is provided to the engine 1 and implements EGR (Exhaust Gas Recirculation) in which a portion of the exhaust gas is recirculated into the intake system, in order to reduce nitrogen oxides (NOx) and enhance fuel consumption. This EGR device 25 comprises an EGR passage 26 that connects the exhaust passage 11 to the intake passage 10, an EGR cooler 27 that cools the exhaust gas in this EGR passage 26, and an EGR valve 28 for adjusting the flow rate of exhaust gas (i.e. of EGR gas) conducted to the intake passage 10. The end portion of this EGR passage 26 on the exhaust gas side opens to the exhaust side branch conduit 15 of the #1 cylinder 2, while its end portion on the intake side opens to the intake manifold 13. As is per se known, the EGR cooler 27 is a device that utilizes the cooling water of the engine 1 as a coolant, and that lowers the temperature of the exhaust gas (i.e of the EGR gas) by performing heat exchange between this coolant and the hot exhaust gas. Due to the temperature of the EGR gas dropping in this way, moisture included in the EGR gas condenses, and accordingly condensed water is generated within the EGR cooler 27.

As shown in FIG. 2 and FIG. 3, a condensed water processing device 30 is provided to the engine 1 in order to perform processing and retrieving of the condensed water CW generated by the EGR cooler 27. This condensed water processing device 30 comprises a storage tank 31 that stores the condensed water CW as the condensed water accumulation portion, a connecting pipe 32 that connects the EGR cooler 27 to the storage tank 31, and four condensed water introduction conduits 33 for introducing the condensed water CW in the storage tank 31 to the four exhaust side branch conduits 15. One of these condensed water introduction conduits 33 is provided for each of the exhaust side branch conduits 15, so that each of these condensed water introduction conduits 33 is communicated with its corresponding exhaust side branch conduit 15 and with the storage tank 31.

In order for it to be possible for the condensed water CW generated by the EGR cooler 27 to be efficiently retrieved to the storage tank 31, the EGR cooler 27 is disposed so that its bottom portion 27a is inclined with respect to the horizontal direction, and moreover the opening portion of the connecting pipe 32 is provided at the lowermost portion of the bottom portion 27a of the EGR cooler 27. Furthermore, the EGR cooler 27 and the storage tank 31 are disposed vertically above the exhaust side branch conduits 15. Due to this, the introduction of the condensed water CW into the exhaust side branch conduits 15 becomes simple and easy, since it is possible to take advantage of gravity to perform this introduction. It should be understood that, in order to prevent exhaust gas from flowing backward through the condensed water introduction conduits 33 into the EGR cooler 27, a non-return valve 35 is provided to the connection pipe 32. The non-return valve 35 prevents flow of fluid from the storage tank 31 toward the EGP cooler 27, while permitting flow of fluid in the opposite direction.

Figure 4:
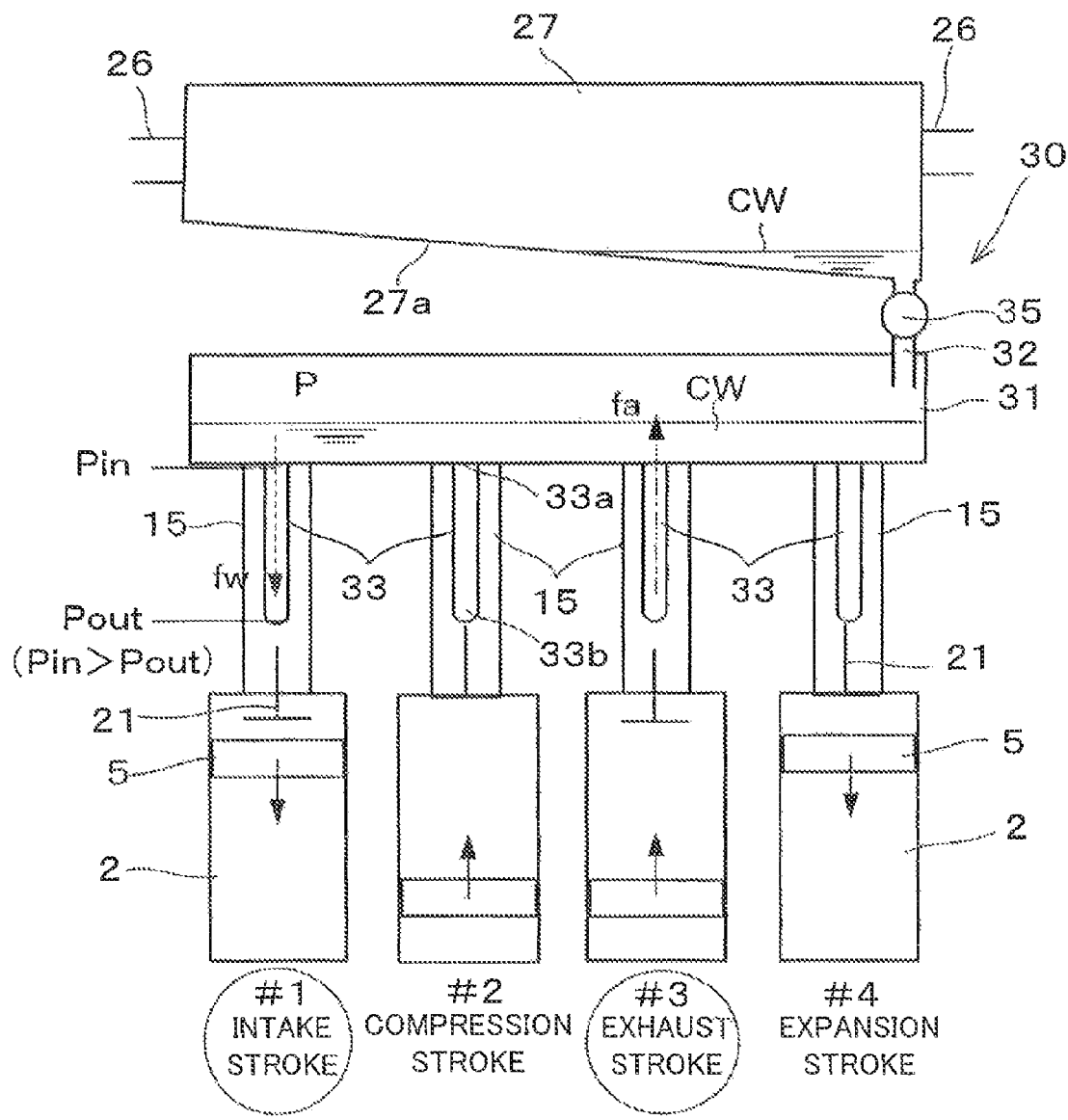
FIG. 4 is an explanatory figure for explanation of the method by which condensed water is introduced.

Introduction of the condensed water CW into the exhaust side branch conduits 15 is implemented during the valve overlap periods of the cylinders 2. For example, as shown in FIG. 4, the case may be considered of overlap of the intake stroke of the #1 cylinder 2 and the exhaust stroke of the #3 cylinder 2. In this case, as shown by the arrow sign fa, the exhaust gas pulsation generated by the exhaust gas stroke of the #3 cylinder 2 pressurizes the interior of the storage tank 31 via the corresponding condensed water introduction conduit 33. In other words, the internal pressure P of the storage tank 31 is raised because of the exhaust gas pulsation generated by the exhaust gas stroke of the #3 cylinder 2. Due to this, during the valve overlap period at the intake stroke of the #1 cylinder 2, the pressure Pout at the outlet 33b of its condensed water introduction conduit 33 is reduced below the internal pressure P of the storage tank 31, in other words is reduced below the pressure Pin at the inlet 33a of its condensed water introduction conduit 33. And, due to this pressure difference, as shown by the arrow sign fw, during the valve overlap period, some of the condensed water CW that is stored in the storage tank 31 is supplied via the corresponding condensed water introduction conduit 33 to the exhaust side branch conduit 15, and thence to the #1 cylinder 2. It should be understood that, since the exhaust valves 21 and the intake valves 20 of the #2 cylinder 2 and of the #4 cylinder 2 are all closed, accordingly the inlet pressures Pin and the outlet pressures Pout of the condensed water introduction conduits 33 that are provided to these cylinders 2 are in equilibrium, so that no condensed water CW is supplied to those cylinders 2. Since with this engine 1 it is possible to supply the condensed water CW into the cylinders 2 in this manner, accordingly no pump is employed, and thus it is possible to avoid corrosion of such a pump.

As can be surmised from the above explanation, it is possible to change the amount of condensed water that is supplied to the cylinders 2 by changing the length of the valve overlap period. Accordingly, in this engine 1, the amount of condensed water that is supplied is made to be appropriate by changing the length of the valve overlap period. As shown in FIG. 1, this engine 1 is provided with an engine control unit (ECU) 40 that is built as a computer that controls various sections of the engine 1. The ECU 40 performs control of the main operations of the engine 1, such as control of the fuel injection valves 6 and control of the variable valve gear 23 and so on. In this embodiment, the ECU 40 is also used for processing related to the condensed water. Signals from a large number of sensors that detect various physical quantities for ascertaining the operational state of the engine 1 are inputted to the ECU 40. For example, to cite sensors that have some relevance to the present invention: a crank angle sensor 41 that outputs a signal corresponding to the crank angle of the engine 1, an accelerator opening amount sensor 42 that outputs a signal corresponding to the amount by which an accelerator pedal 37 is stepped upon (i.e. an accelerator opening amount), an exhaust gas temperature sensor 43 that outputs a signal corresponding to the temperature of the exhaust gas flowing in the exhaust passage 11, and so on, are provided to the engine 1, and the output signals of these sensors are inputted to the ECU 40.

Figure 5:
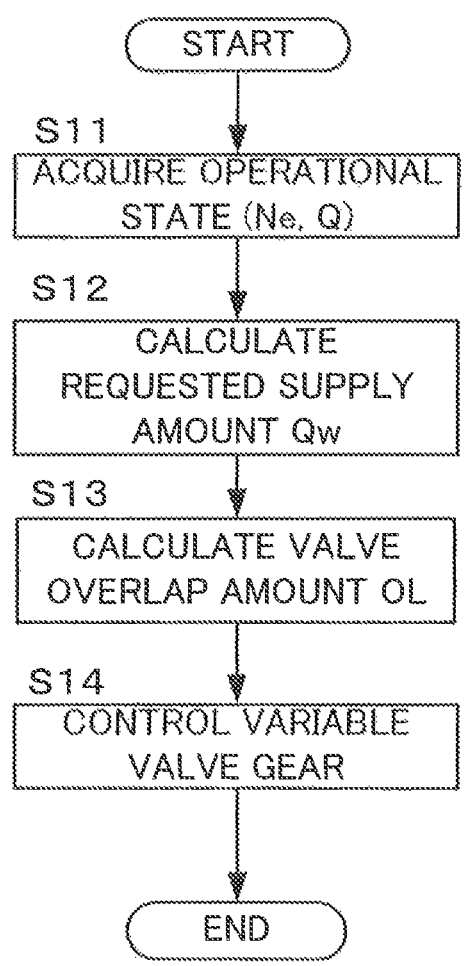
FIG. 5 is a flow chart showing an example of a control routine according to a first embodiment.

The program of the control routine of FIG. 5 is stored in the ECU 40, and is read out in a timely manner and repeatedly executed at predetermined calculation intervals. First, in a step S11, the ECU 40 acquires the operational state of the engine 1. Here, the ECU 40 acquires the engine rotational speed Ne and the fuel injection amount Q of the engine 1. The engine rotational speed is calculated on the basis of the output signal the crank angle sensor 41, and the fuel injection amount Q is calculated on the basis of the output signal of the accelerator opening amount sensor 42.

In a step S12, the ECU 40 calculates a requested supply amount Qw of condensed water that is to be supplied to the cylinders 2 via the condensed water introduction conduit 33. Since the appropriate amount of condensed water that should be supplied to the cylinders 2 changes according to the operational state of the engine 1, accordingly this calculation of the requested supply amount Qw is implemented on the basis of the operational state of the engine 1 that has been acquired in the step S11. In concrete terms, a map (not shown in the figures) giving the requested supply amount Qw in terms of the engine rotational speed Ne and the fuel injection amount Q as variables is created in advance by simulation and by performing testing upon actual equipment, and this map is stored in the ECU 40. The ECU 40 searches in this map, and finds the requested supply amount Qw of condensed water that corresponds to the engine rotational speed Ne and the fuel injection amount Q that were acquired in the step S11.

In a step S13, the ECU 40 calculates a valve overlap period length (i.e. a valve overlap amount OL) that corresponds to the requested supply amount . This valve overlap amount OL is defined in terms of crank angle. When the operational state of the engine 1 changes, such as its rotational speed and so on, the valve overlap amount OL that is appropriate for obtaining the requested supply amount Qw also changes. Due to this, a map (not shown in the figures), giving the valve overlap amount OL in terms of the requested supply amount Qw, the engine rotational speed Ne, and the fuel injection amount Q as variables, is created in advance by simulation and by performing testing upon actual equipment, and this map is stored in the ECU 40. The ECU 40 searches in this map, and calculates the valve overlap amount OL that corresponds to the engine rotational speed Ne and the fuel injection amount Q that were acquired in the step S11 and to the requested supply amount Qw that was calculated in the step S12.

In a step S14, the ECU 40 controls the variable valve gear 23 so as to implement the valve overlap amount OL that was calculated in the step S13. And then this cycle of the routine terminates. Due to this, it is possible to adjust the amount of condensed water supplied to the cylinders 2 in an appropriate manner. By executing the control routine of FIG. 5, the ECU functions as the "condensed water supply amount control device" of the Claims of this application.

Embodiment #2

Next, a second embodiment of the present invention will be explained with reference to FIG. 6 and FIG. 7. Except for the details of the control of the variable valve gear 23 for performing processing related to the condensed water, this second embodiment is the same as the first embodiment described above. Accordingly, in the following description, explanation of elements that are the same as in the first embodiment will be omitted or abbreviated. For the physical structure of the engine 1 of this second embodiment, reference should be made to FIGS. 1 through 3.

Figure 6:
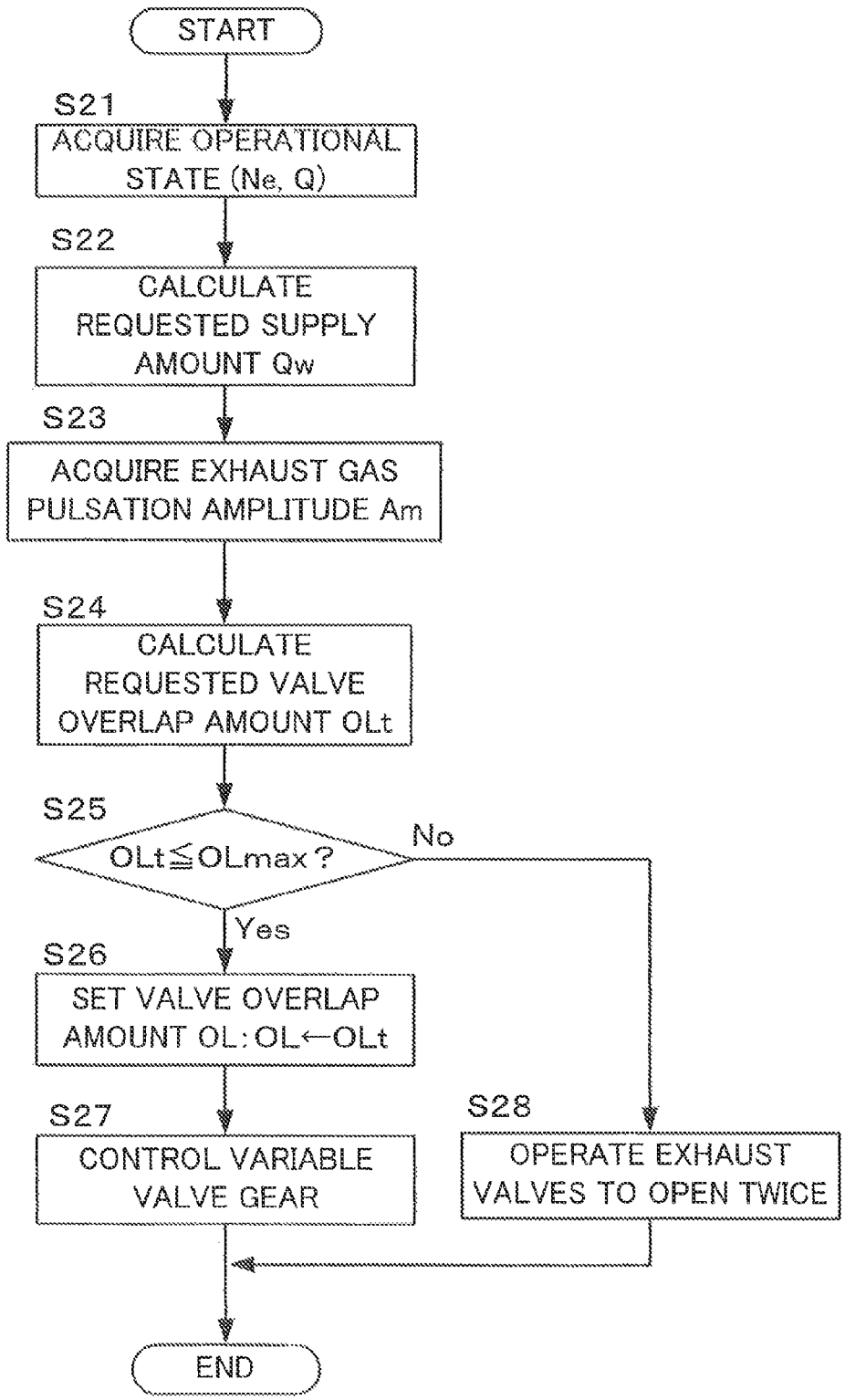
FIG. 6 is a flow chart showing an example of a control routine according to a second embodiment.
Figure 7:
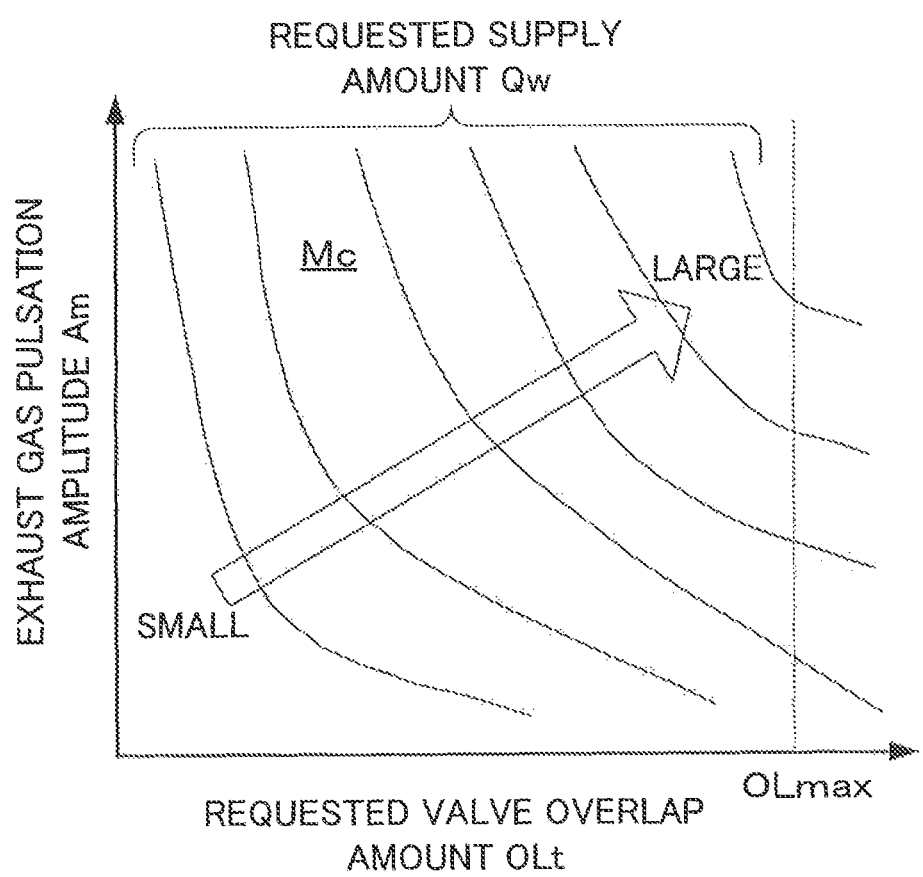
FIG. 7 is a figure schematically showing the structure of a calculation map for calculating a requested valve overlap amount.

The program of the control routine of FIG. 6 is stored in the ECU 40, and is read out in a timely manner and repeatedly executed at predetermined calculation intervals. The details of the processing in the step S21 and the step S22 are the same as the details of the corresponding processing in the first embodiment (refer to FIG. 4). In other words, in the step S11 the ECU 40 acquires the operational state of the engine 1, and in the step S22 the ECU 40 calculates the requested supply amount Qw of condensed water on the basis of the map described above.

In a step S23, the ECU 40 acquires the magnitude of the pulsations of the exhaust gas, in other words acquires the exhaust gas pulsation amplitude Am. This exhaust gas pulsation amplitude Am is defined as being the average value of the amplitude over a predetermined time period. The exhaust gas pulsation amplitude Am may, for example, be measured by providing a pressure sensor in the exhaust manifold 16, but in this embodiment the exhaust gas pulsation amplitude Am is estimated by the ECU 40 on the basis of the engine rotational speed Ne and the fuel injection amount Q. As will be clear from the above explanation and by reference to Fig. 4, when this exhaust gas pulsation amplitude Am becomes larger, since the internal pressure P in the storage tank 31 becomes larger to the same extent, accordingly the pressure differences between the inlet pressure Pin and the outlet pressure Pout of the condensed water introduction conduits 33 become larger. Due to this, when the exhaust gas pulsation amplitude Am becomes large, the flow rate of the condensed water CW flowing into the exhaust side branch conduits 15 from the condensed water introduction conduits 33 becomes large. Accordingly, as explained hereinafter, the supply of condensed water can be made more accurate by calculating the requested supply amount Qw in consideration of the exhaust gas pulsation amplitude Am.

In a step S24, on the basis of the requested supply amount Qw, the ECU 40 calculates a requested value for the valve overlap amount OL, in other words calculates a requested valve overlap amount OLt. This calculation of the requested valve overlap amount OLt is implemented by utilizing a calculation map Mc having characteristics like those shown in FIG. 7, and which has been created on the basis of simulation or testing with actual equipment. In other words, by searching the calculation map Mc, the ECU 40 specifies a requested valve overlap amount OLt corresponding to the requested supply amount Qw that was calculated in the step S22 and to the exhaust gas pulsation amplitude Am that was acquired in the step S23.

Due to limitations of the mechanism, there is an upper limit value upon the valve overlap amount. Because of this, as shown in FIG. 7, if the requested valve overlap amount OLt defined upon the calculation map Mc exceeds this upper limit value OLmax, then it is not possible to implement this requested valve overlap amount OLt. Accordingly, in a step S25, the ECU 40 makes a decision as to whether or not the requested valve overlap amount OLt is less than or equal to the upper limit value OLmax.

If the requested valve overlap amount OLt is less than or equal to the upper limit value OLmax, then the flow of control proceeds to a step S26 in which the requested valve overlap amount OLt is set to the valve overlap amount OL, which is the command value for the variable valve gear 23. And then in a step S27 the ECU 40 controls the variable valve gear 23 so as to implement this valve overlap amount OL that has been set in the step S26. Then this cycle of the routine terminates.

On the other hand, if the requested valve overlap amount OLt is greater than the upper limit value OLmax, then the flow of control is transferred to a step S28, in which the ECU 40 controls the variable valve gear 23 so as to implement double opening operation of the exhaust valves 21. In detail, first, the ECU 40 controls the variable valve gear 23 so as to implement valve overlap with the upper limit value OLmax. And next the ECU 40 calculates the amount of excess of the requested valve overlap amount OLt with respect to the upper limit value OLmax, and calculates a valve opening characteristic for the exhaust valves 21, such as operating angle or the like, that corresponds to this excess amount. And the ECU 40 controls the variable valve driving mechanism 23 so that, after the end of valve overlap when the exhaust valves 21 have been closed, the exhaust valves 21 are opened again according to this valve opening characteristic. And then this cycle of the routine terminates.

In this manner, if the requested valve overlap amount OLt is greater than the upper limit value OLmax, it is possible additionally to introduce further condensed water into the cylinders 2 by double operation of the exhaust valves 21 being implemented. Due to this it is possible to eliminate any deficiency in the supply of condensed water into the cylinders, since it is possible to increase the upper limit for the supply of condensed water. Moreover, it is possible to suppress any tendency for the supply of condensed water to become excessive, since, when the exhaust valves 21 are opened for the second time, the exhaust valves 21 are operated with a valve opening characteristic that corresponds to the excess amount of the requested valve overlap amount OLt with respect to the upper limit value OLmax. By executing the control routine of FIG. 6, the ECU 40 functions as the "condensed water supply amount control device" of the Claims of this application.

Embodiment #3

Next, a third embodiment of the present invention will be explained with reference to FIG. 8 and FIG. 9. Except for the details of the control or the variable valve gear 23 for performing processing related to the condensed water, this third embodiment is the same as the first embodiment or the second embodiment described above. Accordingly, in the following description, explanation of elements that are the same as in the first embodiment or in the second embodiment will be omitted or abbreviated. For the physical structure of the engine 1 of this third embodiment, reference should be made to FIGS. 1 through 3. Moreover, this third embodiment can be implemented in combination with the control of the first embodiment (refer to FIG. 5), and also can be implemented in combination with the control of the second embodiment (refer to FIG. 6). In the following, the combination of this embodiment with the control of the first embodiment will be explained.

This engine 1 is one in which the condensed water is not directly introduced into the cylinders 2, but is one in which the condensed water is introduced into the cylinders 2 via the exhaust side branch conduits 15. Due to this, when condensed water is supplied into one of the exhaust side branch conduits 15, one portion thereof remains stagnant within that exhaust side branch conduit 15, while the other portion thereof flows into the cylinder 2. The ratio between the amount of the condensed water that remains stagnant within the exhaust side branch conduit 15 and the amount of the condensed water that flows into the cylinder 2 is determined by the specification of the engine 1 such as the construction of the engine 1 or the position of introduction of the condensed water and so on. If this ratio is appropriate, then the temperature of the exhaust gas will be kept at a standard temperature. There is a possibility that the relationship between this ratio and the standard temperature may change due to individual differences or due to long term deterioration of the engine 1. For example, it has been ascertained that the ratio above may change due to change of the pressure within the cylinders 2 (i.e., the internal cylinder pressure) because of individual differences or long term deterioration of the engine 1. That is to say, if the cylinder internal pressure is high, then the proportion of the condensed water that is conducted into the cylinders 2 may become too small, whereas if the cylinder internal pressure is low, then the proportion of the condensed water that is conducted into the cylinders 2 may become excessive. If the proportion of the condensed water that is conducted into the cylinders 2 (i.e. the into-cylinder proportion) becomes too small or too great in terms of the appropriate value, then the amount of condensed water that is processed within the cylinders 2 changes, even though the same amount of condensed water is introduced into the exhaust side branch conduits 15. This change reflects the change of the exhaust gas temperature with respect to the standard temperature when the into-cylinder proportion is an appropriate value.

As shown in FIG. 8, the relationship T2<T0<T1 holds for the exhaust gas temperatures T0, T1, and T2 which respectively relate to (1) the case when the into-cylinder proportion is appropriate, (2) the case when the into-cylinder proportion is excessive, and (3) the case when the into-cylinder proportion is too small. When the into-cylinder proportion is excessive, then, since the proportion of the condensed water that remains stagnant within the exhaust side branch conduits 15 becomes small, accordingly the temperature T1 of the exhaust gas that is discharged in the exhaust strokes becomes higher than the standard temperature T0. In this case, by reducing the amount of the condensed water that is introduced into the exhaust side branch conduits 15, it is possible to bring the amount of condensed water that is introduced into the cylinders 2 closer to an appropriate value. On the other hand, if the into-cylinder proportion is too great, then, since the proportion of the condensed water that remains stagnant within the exhaust side branch conduits 15 becomes great, accordingly the temperature T2 of the exhaust gas that is discharged by the exhaust strokes becomes lower than the standard temperature T0. In this case, by increasing the amount of the condensed water that is introduced into the exhaust side branch conduits 15, it is possible to bring the amount of condensed water that is introduced into the cylinders 2 closer to an appropriate value. The amount of supplied condensed water that is introduced into the exhaust side branch conduits 15 is correlated with the valve overlap amount. Thus, in order to cancel deviation of the exhaust gas temperature with respect to the standard temperature, the ECU 40 implements a reduction correction amount or an increase correction amount for the valve overlap amount on the basis of the exhaust gas temperature.

Figure 9:
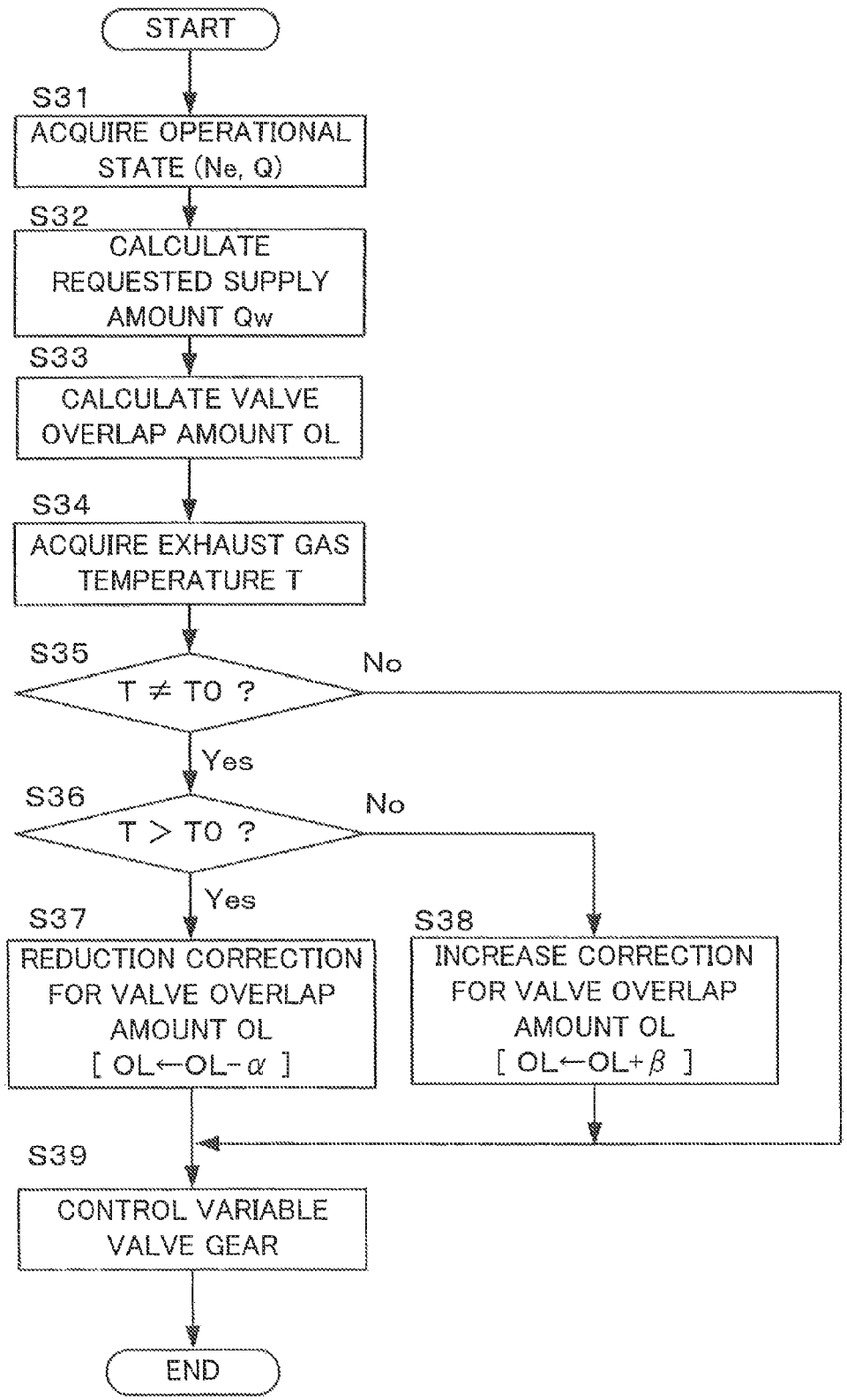
FIG. 9 is a flow chart showing an example of a control routine according to this third embodiment.

The program of the control routine of FIG. 9 is stored in the ECU 40, and is read out in a timely manner and repeatedly executed at predetermined calculation intervals. The details of the processing of the steps S31 through S33 are the same as the details of the corresponding processing in the first embodiment (refer to FIG. 4). In other words, in the step S31, the ECU 40 acquires the operational state of the engine 1. In the step S32, the ECU 40 calculates the requested supply amount Qw of condensed water on the basis of the map described above. And in the step S33, the ECU 40 calculates the valve overlap amount OL.

Then in a step S34 the ECU 40 refers to the output signal of the exhaust gas temperature sensor 43 (refer to FIG. 1) and acquires the exhaust gas temperature T. And in the next step S35 the ECU makes a decision as to whether or not this exhaust gas temperature T is different from the standard temperature T0. It should be understood that, in the processing of the step S35, it is also possible to suppress hunting by treating a case in which the difference between the exhaust gas temperature T and the standard temperature T0 is greater than a predetermined value as being a case in which the exhaust gas temperature is different from the standard temperature T0, while treating a case in which this difference is less than or equal to the predetermined value as being a case in which the exhaust gas temperature is the same as the standard temperature T0. If the exhaust gas temperature T is different from the standard temperature T0 then the flow of control proceeds to a step S36, while if this is not the case then the subsequent steps S36 through S38 are skipped since correction is unnecessary, and the flow of control is transferred to a step S39.

In the step S36, the ECU 40 makes a decision as to whether or not the exhaust as temperature T is lower than the standard temperature T0. The standard temperature T0 is set in advance on the basis of the results of testing with actual equipment, or the like. And, if the exhaust gas temperature T is lower than the standard temperature T0, then the flow of control proceeds to a step S37, in which the ECU 40 corrects the valve overlap amount OL in the direction to decrease it. In concrete terms, the valve over amount OL that was calculated in the step S33 is updated by subtracting a correction amount α from this valve overlap amount OL. On the other hand, if the exhaust gas temperature T is higher than the standard temperature T0, then the flow of control is transferred to a step S38, in which the ECU 40 corrects the valve overlap amount OL in the direction to increase it. In concrete terms, the valve overlap amount OL that was calculated in the step S33 is updated by adding a correction amount β to this valve overlap amount OL. It should be understood that it may be arranged for the correction amounts α and β to be equal to one another; or, alternatively, they may be different from one another. Moreover, these correction amounts α and β may be constant, or may be variable. If these correction amounts α and β are variable, then it would further be possible to vary them according to the difference between the exhaust gas temperature T and the standard temperature T0.

In the step 39, the ECU 40 controls the variable valve gear 23 so as to implement the valve amount OL that was calculated in the step S33, or so as to implement the valve overlap amount OL after amendment that was calculated in the step S37 or in the step S38. And then this cycle of this routine terminates.

Since, according to the control routine of FIG. 9, if the exhaust gas temperature T is higher than the standard temperature T0 then the valve overlap amount OL is corrected in the direction to decrease it, accordingly the amount of supplied condensed water that is conducted into the cylinders 2 is reduced, as compared to the case in which this amount is based upon the map. On the other hand, since if the exhaust gas temperature T is lower than the standard temperature T0 then the valve overlap amount OL is corrected in the direction to increase it, accordingly the amount of supplied condensed water that is conducted into the cylinders 2 is increased. Therefore, it is possible to bring an amount of condensed water that is supplied into the cylinders 2 that is excessive, or that is inadequate, closer to an appropriate value. By executing the control routine of FIG. 9, the ECU 40 functions as the "condensed water supply amount control device" of the Claims of this application.

The present invention is not to be considered as being limited to the embodiments described above; the present invention could be implemented in various different ways, provided that its essential scope is not departed from. While the embodiments of the present invention described above were engines that were provided with a variable valve gears that were capable of varying the length of the valve overlap period, it is not essential for such a variable valve gear to be provided to the present invention. For example, it would be possible to implement the present invention as a multi-cylinder internal combustion engine in which the length of the valve overlap period is fixed, so that it is not possible to vary the length of the valve overlap period. If the present invention is implemented as a multi-cylinder internal combustion engine of this type, then the amplitude of the pulsations of the exhaust gas becomes high in the high rotational speed high load region in which the requested supply amount of condensed water becomes great. Due to this, even though the length of the valve overlap period is fixed, the amount of condensed water that is supplied becomes greater as compared to the low rotational speed low load region. Due to this, to some extent, it is possible to prevent excess or shortage of the supply amount of condensed water.

While the engines 1 according to the embodiments described above was built as a diesel engine, the engine to which the present invention is applied is not limited to being a diesel engine. Accordingly, it would also be possible to implement the present invention as a spark ignition type engine. Furthermore, while the engines 1 were four cylinder in-line type engines, the arrangement of the cylinders and the number of the cylinders are not particularly limited. For example, provided that a plurality of cylinders is provided, the present invention could be implemented as a V-type engine or as a horizontally opposed type engine. And while, in the embodiments described above the outlets of the condensed water introduction conduits 33 were provided in the branch conduits 16a that were included in the exhaust side branch conduits 15, it would also be possible to chance these outlets to the exhaust ports 17 that are included in the exhaust side branch conduits 15.

The invention claimed is:

1. A multi-cylinder internal combustion engine to which an exhaust gas recirculation (EGR) device comprising an EGR cooler is provided, for which a valve overlap period in which valve opening periods of intake valves and of exhaust valves of each cylinder of the multi-cylinder internal combustion engine overlap one another is set, and moreover comprising a plurality of cylinders, and comprising:
   a plurality of exhaust side branch conduits, each provided to an exhaust side of each of the cylinders;
   a condensed water accumulation portion configured to store condensed water generated by the EGR cooler; and
   a plurality of condensed water introduction conduits, each provided for each of the exhaust side branch conduits so as to open to the exhaust side branch conduit in order to communicate the exhaust side branch conduit with the condensed water accumulation portion.

2. The multi-cylinder internal combustion engine according to claim 1, further comprising:
   a variable valve gear capable of varying a length of the valve overlap period; and
   a condensed water supply amount control device configured to control the variable valve gear so that the length of the valve overlap period changes on the basis of a requested supply amount of the condensed water generated by the EGR cooler to be supplied into the cylinders via the condensed water introduction conduits.

3. The multi-cylinder internal combustion engine according to claim 2, wherein the condensed water supply amount control device is configured to correct the length of the valve overlap period in a direction to decrease it when the temperature of exhaust gas generated by the internal combustion engine is higher than a predetermined standard temperature.

4. The multi-cylinder internal combustion engine according to claim 2, wherein:
the variable valve gear is adapted to be able to open the exhaust valves during an intake stroke after the valve overlap period has ended; and
the condensed water supply amount control device is configured to control the variable valve gear so that, if a requested value for the length of the valve overlap period on the basis of the requested supply amount is greater than an upper limit value, the exhaust valves are opened during the intake stroke after the valve overlap period has ended.

5. The multi-cylinder internal combustion engine according to claim 1, wherein
the EGR cooler and the condensed water accumulation portion are disposed vertically above the plurality of exhaust side branch conduits.

* * * * *